United States Patent
Bruno et al.

(10) Patent No.: US 9,154,402 B2
(45) Date of Patent: Oct. 6, 2015

(54) METHOD AND SYSTEM FOR GATEWAY SELECTION IN INTER-REGION COMMUNICATION ON IP NETWORKS

(75) Inventors: Aurelien Bruno, Nice (FR); John M. Ciesielczyk, Barrington Hills, IL (US); Aline Fichou, La Colle sur Loup (FR); Jean-Francois Le Pennec, Nice (FR); Herve Tremeur, St Laurent Du Var (FR)

(73) Assignee: AT&T INTELLECTUAL PROPERTY II, L.P., Atlanta, GA (US)

( * ) Notice: Subject to any disclaimer, the term of this patent is extended or adjusted under 35 U.S.C. 154(b) by 2021 days.

(21) Appl. No.: 11/482,866

(22) Filed: Jul. 7, 2006

(65) Prior Publication Data
US 2007/0011351 A1    Jan. 11, 2007

Related U.S. Application Data
(60) Provisional application No. 60/697,618, filed on Jul. 8, 2005.

(51) Int. Cl.
| | |
|---|---|
| G06F 15/16 | (2006.01) |
| H04L 12/715 | (2013.01) |
| G06Q 30/02 | (2012.01) |
| H04L 12/701 | (2013.01) |
| H04L 12/751 | (2013.01) |
| H04L 12/707 | (2013.01) |

(52) U.S. Cl.
CPC ............ *H04L 45/04* (2013.01); *G06Q 30/02* (2013.01); *H04L 45/00* (2013.01); *H04L 45/02* (2013.01); *H04L 45/24* (2013.01)

(58) Field of Classification Search
CPC ...................................................... G06Q 30/02
USPC .......................................................... 709/238
See application file for complete search history.

(56) References Cited

U.S. PATENT DOCUMENTS
| | | | |
|---|---|---|---|
| 6,256,309 B1 | 7/2001 | Daley | |
| 6,260,070 B1 | 7/2001 | Shah | |
| 6,584,093 B1 * | 6/2003 | Salama et al. | 370/351 |
| 7,349,994 B2 * | 3/2008 | Balonado et al. | 709/250 |
| 7,366,187 B2 * | 4/2008 | McCabe | 370/401 |
| 7,406,539 B2 * | 7/2008 | Baldonado et al. | 709/240 |

(Continued)

OTHER PUBLICATIONS
Rekhter et al., "RFC 1771—A Border Gateway Protocol 4 (BGP-4)", Mar. 1995, IETF—Network Working Group, www.ietf.org/rfc/rfc1771.txt.*

(Continued)

*Primary Examiner* — Douglas Blair
(74) *Attorney, Agent, or Firm* — Fay Kaplun & Marcin, LLP

(57) ABSTRACT

A method including formatting an advertisement message having a dedicated preferred route to one of a first physical entity and a first logical entity of a first autonomous system ("AS"), the dedicated preferred route being based on at least two routing attributes, and transmitting the advertisement message from the first AS to a second AS. A routing device including a formatting module formatting an advertisement message having a dedicated preferred route to one of a first physical entity and a first logical entity of a first autonomous system ("AS"), the dedicated preferred route being based on at least two routing attributes, and a transmitting module transmitting the advertisement message from the first AS to a second AS.

13 Claims, 2 Drawing Sheets

(56) References Cited

U.S. PATENT DOCUMENTS

| | | | | |
|---|---|---|---|---|
| 7,581,022 | B1* | 8/2009 | Griffin et al. | 709/238 |
| 7,693,069 | B2* | 4/2010 | Hao et al. | 370/237 |
| 7,773,536 | B2* | 8/2010 | Lloyd et al. | 370/252 |
| 7,787,396 | B1* | 8/2010 | Nalawade et al. | 370/254 |
| 7,840,704 | B2* | 11/2010 | Balonado et al. | 709/241 |
| 8,018,953 | B1* | 9/2011 | Zhao | 370/400 |
| 2002/0075813 | A1* | 6/2002 | Baldonado et al. | 370/254 |
| 2002/0078223 | A1* | 6/2002 | Baldonado et al. | 709/232 |
| 2003/0174653 | A1* | 9/2003 | Basu et al. | 370/238 |
| 2004/0208175 | A1* | 10/2004 | McCabe | 370/389 |
| 2005/0025118 | A1* | 2/2005 | Hao et al. | 370/351 |
| 2008/0095157 | A1* | 4/2008 | McCabe | 370/389 |
| 2009/0052457 | A1* | 2/2009 | Salama et al. | 370/392 |

OTHER PUBLICATIONS

P. Traina, "RFC 1965—Autonomous System Confederations for BGP", IETF Network Working Group, all pages.*

* cited by examiner

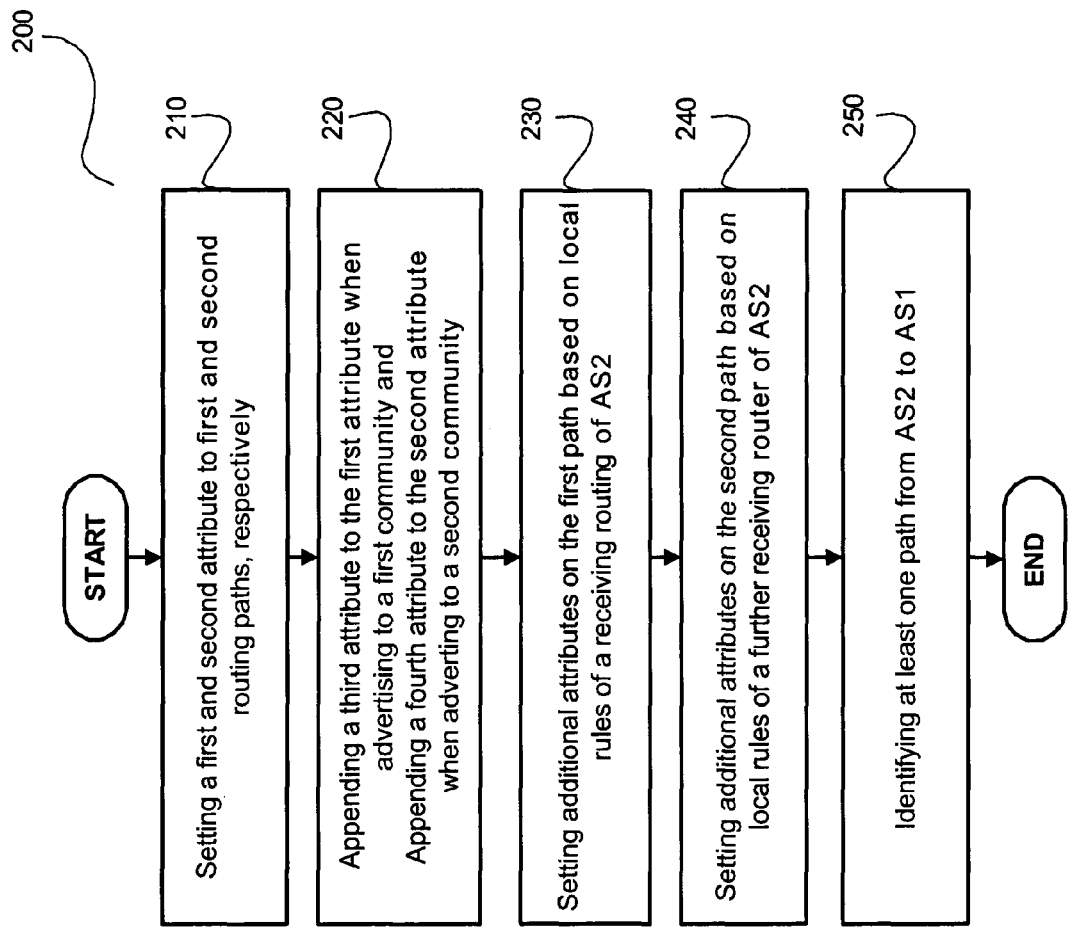

METHOD AND SYSTEM FOR GATEWAY SELECTION IN INTER-REGION COMMUNICATION ON IP NETWORKS

PRIORITY/INCORPORATION BY REFERENCE

The present application claims priority to U.S. Provisional Patent Application No. 60/697,618 entitled "Gateway selection for inter-region communication on IP networks" filed on Jul. 8, 2005, the specification of which is expressly incorporated herein by reference.

BACKGROUND

Routing protocols allow for the communication between various computer networks. Currently when multiple PNPVC/IPVC are set between two autonomous systems ("AS"), the traffic load is balanced between them. For example, delay variations exists with inter-regional links and intra-regional links between Asia-to-Europe, Middle East, Africa ("EMEA") via the U.S. and Asia-to-EMEA via Middle East or South Africa. In addition, the cost of bandwidth via the U.S. is much lower than the other links while the delay is much higher. Therefore, only selected traffic would take the more direct link. There is no criteria or method of forcing the use of one path over the use of another path. Link utilization is not optimized on the basis of the type of path or the source/destination within an Internet Protocol ("IP") network.

A Border Gateway Protocol ("BGP") system may be used to provide inter-domain routing between autonomous systems ("ASs"). BGP systems exchange network reachability information with other BGP systems. This information is used to construct a graph of AS connectivity from which routing loops are pruned and with which AS-level policy decisions are enforced. A BGP system provides a number of techniques for controlling the flow of BGP updates, such as route, path, and community filtering. It further provides techniques for consolidating routing information, such as classless inter-domain routing ("CIDR") aggregation, confederations, and route reflectors. BGP is a scalable and powerful tool for providing loop-free inter-domain routing within and between multiple ASs.

SUMMARY OF THE INVENTION

A method including formatting an advertisement message having a dedicated preferred route to one of a first physical entity and a first logical entity of a first autonomous system ("AS"), the dedicated preferred route being based on at least two routing attributes, and transmitting the advertisement message from the first AS to a second AS.

A routing device including a formatting module formatting an advertisement message having a dedicated preferred route to one of a first physical entity and a first logical entity of a first autonomous system ("AS"), the dedicated preferred route being based on at least two routing attributes, and a transmitting module transmitting the advertisement message from the first AS to a second AS.

A system for providing a choice of optimized routing paths including a first autonomous system ("AS") including a plurality of first autonomous system border routers ("ASBRs"), at least one first physical entity, and at least one first logical entity, wherein at least one of the plurality of first ASBRs formats an advertisement message having a dedicated preferred route to the at least one first physical entity and a first logical entity, the dedicated preferred route being based on at least two routing attributes, wherein the at least one of the plurality of first ASBRs further transmits the advertisement message from the first AS, and a second AS including a plurality of second ASBRs, at least one second physical entity, and at least one second logical entity, wherein at least one of the plurality of second ASBRs generates a further routing attribute upon receiving the advertisement message from the first AS, wherein one of the at least one second physical entity and the at least one second logical entity identifies the dedicated preferred route based on the further attribute.

BRIEF DESCRIPTION OF THE DRAWINGS

FIG. 2 shows an exemplary method for optimizing routing through gateway selection based on defined criteria according to the present invention.

DETAILED DESCRIPTION

Figure 1:
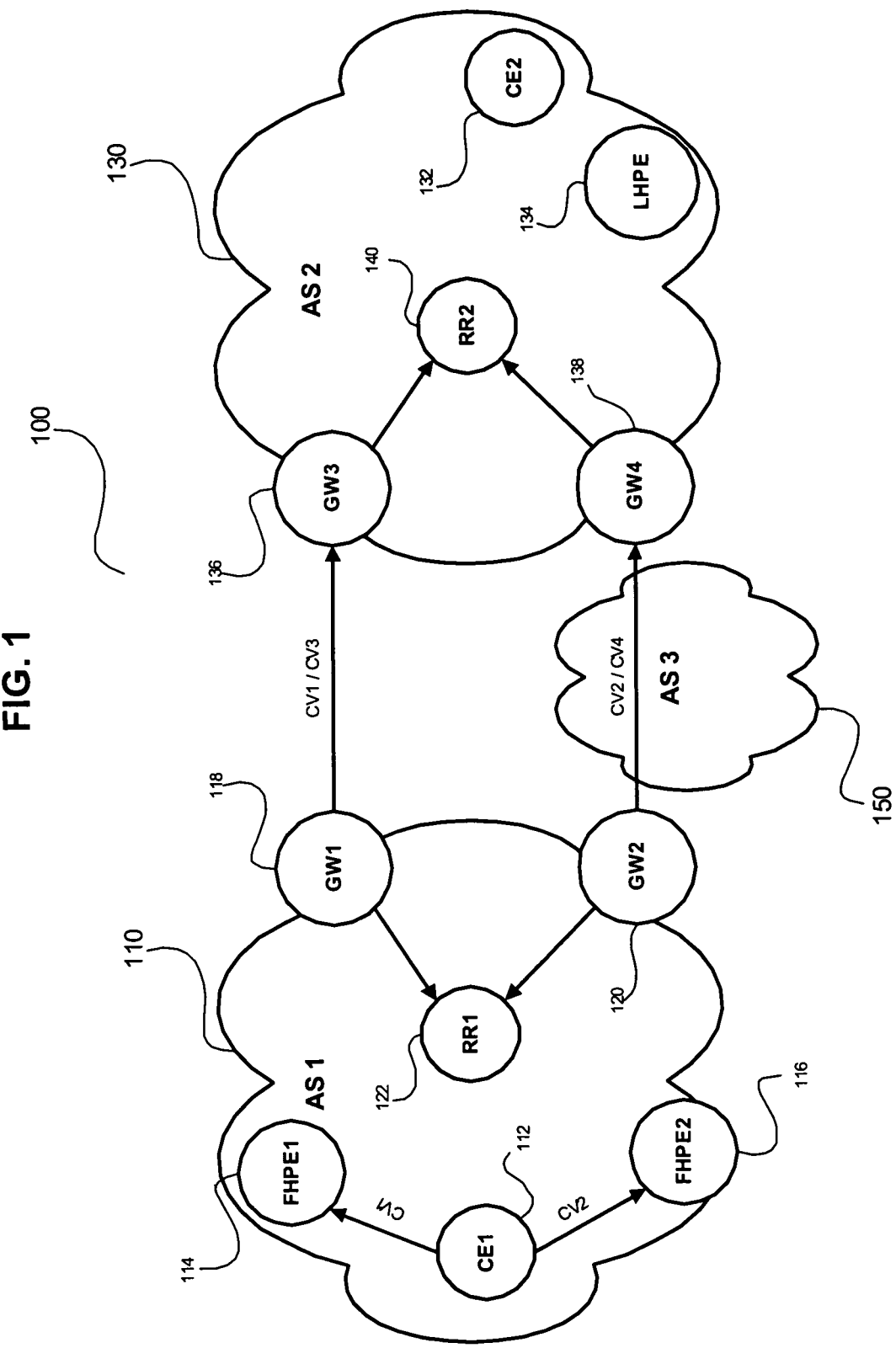
FIG. 1 shows an exemplary system for optimizing routing through gateway selection based on defined criteria according to the present invention.

The present invention may be further understood with reference to the following description of exemplary embodiments and the related appended drawings, wherein like elements are provided with the same reference numerals. The present invention is related to systems and methods used for the selection of a gateway ("GW") for inter-region communication on Internet Protocol ("IP") networks. Specifically, the present invention is related to systems and methods for providing a choice of selecting a GW for optimized IP routing based on per-origin/per-destination criteria. This GW selection design offers the capability to assign some routes only to some selected devices or logical entities without changing the routing model. Furthermore, the GW selection design may save bandwidth in high cost links by selecting the flows that are allowed on optimal, but costly, links.

In multi-region networking, there is a need to define different routing preferred paths between regions based on a set of several parameters. A first parameter for selection criteria may be on the originating side of a sub-region. A second parameter may be a virtual private network ("VPN"). A third parameter may be selected elements that correspond to the first and second parameters. A fourth parameter may be on the destination side of a receiving sub-region. Given all of these parameters, it may not be easy to take into account each requirement with a single routing control plane. This may be the case in a multi-VPN Multiprotocol Label Switching ("MPLS") network, where multiple VPNs are routed in a preferred provider environment. While solutions have been previously present on protocols such as asynchronous transfer mode ("ATM"), the present invention makes use of alternative routing protocols.

According to an exemplary embodiment of the present invention, the routing parameters may be based on attributes of an IP routing protocol, specifically, a border gateway protocol ("BGP"). A BGP may be defined as a path vector (or policy routing) protocol for maintaining reachability between multiple autonomous systems. An autonomous system ("AS") may be defined as a network or a group of networks under a common administration and having common routing policies to the Internet. Within a BGP, each AS may be allocated an AS number ("ASN") for uniquely identifying the network on the Internet. Thus, the BGP may be used to exchange routing information between entities of multiple AS, wherein the routing information may be maintained in a routing table of IP networks or prefixes.

Customer networks usually employ an interior gateway protocol ("IGP") such as Routing Information Protocol ("RIP") or Open Shortest Path First ("OSPF") for exchanging routing information within the customer networks. While the customers connect to ISPs, the ISPs use BGP to exchange customer and service provider routes. When BGP is used within an AS to exchange routes, the protocol is referred to as Interior BGP ("IBGP"). When BGP is used between ASs, the protocol is referred to as External BGP ("EBGP"). Thus, routing information may be exchanged within an AS through the IBGP protocol or may be exchanged between multiple ASs through the EBGP protocol. As a robust and scalable routing protocol, BGP may use the route properties, or attributes, to define routing policies and maintain a stable routing environment. Neighbors on a BGP are established by exchanging full routing table information between a BGP router to create a Transmission Control Protocol ("TCP") connection. The TCP connection allows for the transportation of logically addressed packets. The use of TCP as the transport protocol is unique to BGP among routing protocols. When two or more routers have opened a TCP connection between each other for the purpose of exchanging routing information, these routers may be referred to as neighbors or peers.

Based on the routing information carried by the BGP, dynamic routing may be used to construct routing tables automatically in order to allow for a network to act autonomously when avoiding network failures and blockages. When changes to the routing table are detected, the BGP router may send only the routing information that has changed to the neighbors on the BGP. BGP routers may not send periodic routing updates and BGP routing updates may advertise only the optimal path to a destination network. As discussed above, the present invention provides a choice for selecting an optimal path by adding dedicated preferred paths to certain logical or physical entities. Furthermore, the present invention provides a method for selecting all these paths, such as preferred paths and legacy optimal paths, in a predefined and dynamically built manner.

In order to add dedicated preferred paths to some logical or physical entities, selected BGP attributes may be used in an extensive manner. Routes that are learned through BGP routers have associated attributes that may be used to determine the best route from a source to a destination when multiple paths exist between the source and destination. Possible BGP attributes include weight, local preference, multi-exit discriminator, origin, AS path, next hop, and community. Furthermore, each BGP attribute may be placed in an ordered list according to priority settings. Therefore, for example, a BGP router that places the highest priority on the weight attribute may first look at the weights available on two different paths, and simply select the best path without considering any other lower priority attributes if the two paths have different weight values.

Certain sites utilize a preferred path via one Autonomous System Border Routers ("ASBRs"), or gateways ("GWs"), while other sites utilize another preferred path via a different GW. However there is no criteria or method for forcing the use of one GW over the use of another GW. Link utilization is not optimized on the basis of the source and/or destination IP address that uses the link. An exemplary GW selection of the present invention provides a choice of selecting an optimized GW based on a per-origin and/or per-destination criteria. Furthermore, according to an exemplary embodiment of the present invention, weight, local preference, and community will be the preferred BGP attributes used for determining the optimal path from the a GW of one AS to a GW of another AS. However, one skilled in the art would understand that any attribute (including, but not limited to, the above listed attributes) may be used in conjunction with or may replace one of the preferred BGP attributes.

Initially, several examples will be discussed. For example, the weight attribute may be defined as an attribute used in the path selection process when there are multiple routes to a single destination. The weight attribute is local to the router on which it is assigned and it is not advertised to neighboring routers. If a router learns about more than one route to the same destination, the route having the highest weight will be preferred. In addition, the route with highest weight will be installed in the IP routing table of the local router.

In another example, the local preference attribute may be defined as an attribute used to indicate a preferred exit point from the local AS when there are multiple paths to a single destination. Unlike the weight attribute, which is only relevant to a local router, the local preference attribute is exchanged throughout the routers of the local AS via a routing update. If there are multiple exit points from the AS, the local preference attribute is used to select the exit point for a specific route.

In a further example, the community attribute provides a manner of grouping destinations based on applied routing decisions. Each of the destinations may be community defined by routing decisions such as acceptance, preference, redistribution, etc. Route maps may be used to set the community attribute. After using, for example, the above reference attributes to select a best path, a BGP router may store the path in its routing table and propagate the path to the neighboring BGP routers within the AS. According to an embodiment of the present invention, selected BGP attributes may be compared within a routing control plane in order to determine more than one optimal path which meet a predetermined criteria set.

FIG. 1 shows an exemplary system 100 for selecting an optimized GW based on routing protocol attributes according to the present invention. The system 100 may include three autonomous systems AS1 110, AS2 130, and AS3 150, wherein each AS corresponds to a geographical region. For illustrative purposes, FIG. 1 demonstrates a system and method used for formatting an advertisement message having a dedicated preferred route from AS2 130 to AS1 110. It would be obvious to one skilled in the art to notice that the path definition done from AS1 110 to AS2 130 on the routing control plane is only for the transmission of data from AS2 130 to AS1 110. A similar symmetric mechanism may define the reverse routes, wherein the reverse routes may or may not utilize the same paths.

A MPLS network may be implemented within each of the ASs (AS1 110, AS2 130, and AS3 150). An MPLS network may be described as a dynamic label-switching mechanism for improving the exchange of data, e.g. IP packets, within a telecommunication network. MPLS allows for unified exchanging of data for both circuit-base clients and packet-switching clients. On a Provider Edge ("PE") router of an MPLS network, an interior routing protocol and label distribution mechanism may dynamically process information regarding IP reachability with information regarding available label-switching paths within the MPLS network. Based on this routing information, a "best-path" may be selected and forwarded to the Customer Edge ("CE") router.

According to an exemplary embodiment of the present invention, AS1 110 includes a CE router, CE1 112, that is dual-homed to two First Hop Provider Edge ("PE") routers, FHPE1 114 and FHPE2 116. It is important to note that an AS structured to be multi-homed, or dual-homed, maintains connections to multiple Internet Service Providers ("ISPs"). Under this structure, the AS may remain connected to the Internet during a connection failure between the AS and one of the ISPs. In addition, there may be two PE routers which function as Autonomous System Border Routers ("ASBRs"), or gateways ("GWs"), within the exemplary AS1 110, namely GW1 118 and GW2 120.

Finally, AS1 110 may include a Route Reflector, RR1 122, within the IBGP structure to improve the scalability of intra-AS route dissemination. RR1 122 may eliminate the need for the IBGP of AS1 110 to be fully meshed. Normally, all routers within an IBGP must be within the IBGP mesh to have a full view of the transit routes available. However, as opposed to having each router peer with all of the routers within the IBGP network, RR1 112 allows for the other IBGP router to view available routes through RR1 122. Thus, GW1 118 and GW2 120 may be in communication with RR1 122 in order to advertise the learned IBGP routes to all the routers within AS1 110. As opposed to GW1 118 and GW2 120 providing routing table information to each of the routers in AS1 110, this routing information may be transferred to the RR1 122. Thus, RR1 122 may act as a focal point within AS1 110. Each of the routers within AS1 110 may simply peer with RR1 122 for routing information rather than peer with every other router within AS1 110. Alternatively, the IBGP mechanism may be performed by a pure Point-to-Point IBGP peering session.

Similar to AS1 110, AS2 130 may include a CE router, CE2 132. However, CE2 132 is connected to a Last Hop Provider Edge router, LHPE1 134. LHPE1 134 is the PE router that takes the final decision based on routing updates having internal community value ("CV") attributes. A community may be defined as a grouping of destinations, and a community value may be defined as a unique number assigned by an ISP to an edge router within that community of routing destinations. Furthermore, AS2 130 may include two ASBR PEs, GW3 136 and GW4 138, wherein the neighbor of GW1 118 on AS2 130 is GW3 136 and the neighbor of GW2 120 on AS2 130 is GW4 138. The connectivity between the GWs may be direct, or alternatively, through another AS such as, for example, AS3 150 between GW2 120 and GW4 138. In addition, AS2 130 may include a reflecting router, RR2 140, for advertising the learned IBGP routes within AS2 130, or, alternatively, may include a different IBGP mechanism such as a pure Point-to-Point IBGP session.

FIG. 2 shows an exemplary method 200 for optimizing routing through gateway selection based on defined criteria according to the present invention. This method 200 may provide more than one optimal path through adding dedicated preferred paths between logical or physical entities of at least two ASs. Furthermore, method 200 allows for the selection of all of these paths in a predefined but dynamically built manner. The exemplary method 200 will be described with reference to the exemplary system 100 of FIG. 1.

In step 210, CE1 112 of the AS1 110 may set an attribute (e.g. a community value of CV1) on a first routing path from AS2 130 to FHPE1 114 of AS1 110. In addition, CE1 112 may also set a further attribute (e.g. a community value of CV2) on a second routing path from AS2 130 to FHPE2 116 of AS1 110.

In step 220, GW1 118 of AS1 110 may format an advertisement message having a dedicated preferred route from a first community, wherein the first community may have a community value of CV1. When advertising the routing of a first community with CV1, GW1 118 may append an additional attribute (e.g., community value of CV3) on the routing path to AS2 130. Likewise, when formatting an advertisement message having a dedicated preferred route from a second community with CV2, GW2 120 may append a further additional attribute (e.g., community value of CV4) on the routing path to AS2 130. Optionally, GW2 120 may also perform a DENY action on all other types of advertisements to AS2 130. Therefore, AS1 110 may deny any updates originating from AS2 130, thereby filtering the routing information from AS2 130 and effectively preventing AS1 110 from learning this information from AS2 130. Thus, an exemplary first advertising message from GW1 118 may be a CV1/CV3 advertisement. An exemplary second advertising message from GW2 120 may be a CV2/CV4 advertisement.

In step 230, upon receiving the first advertisements from GW1 118, GW3 136 may have local rules for independently setting additional routing attributes to this routing entity in order to allow only defined traffic to use this path as the preferred route while denying all other traffic. Depending on the local rules of GW3 136, the attribute that is set may be, for example, weight and/or local preference. Alternatively, GW3 136 may set this route as the preferred route for all traffic except for some local routing entities. In other words, GW3 136 may specify an access list on incoming and outgoing routing information based on the values of an attribute. Optionally, GW3 136 can set the local preference attribute in another PE or in CE2 132 of AS2 130. The routing information is further transferred to RR2 140 in order to advertise the information to all routers within AS2 130. Furthermore, an exemplary local routing attribute may be a default weight for each path. For a new route, a PE may choose to set the new path with a higher weight or, alternatively, a lower weight, in order to force the use, or prevent the use, of this particular path. Thus, the PE may decide to either advertise this path, or router, to all other routers or to limit the advertisement of the path.

In step 240, upon receiving the second advertisement from GW2 120 of AS1 110, GW4 138 of AS2 130 may forward the advertisement to other PE routers (e.g., LHPE 134) within AS2 130. Similar to the actions performed by GW3 130, GW4 138 may set routing attributes to this routing entity based on the local rules of GW4 138. Optionally, LHPE 134 of AS2 130 may use local rules and set the additional attributes to the routes received from GW4 138 to select a "best route" to advertise to CE 132 of AS2 130.

Finally, in step 250, AS2 130 may identify at least one routing path from AS2 130 to AS1 110. Thus, the above-described method may provide the ability to only assign some routes to certain selected devices or local entities within an AS without changing the routing model. These assignments may be based on the exemplary BGP attributes of the various devices in order to achieve optimized IP routing between multiple ASs.

According to the exemplary method 200 of the present invention, a primary path may be advertised between AS1 110 and AS2 130. A route initiating from AS1 110 for a first community in AS2 130 may be set with a community value of CV1. The GW1 118 of AS1 110 may amend a further community value of CV3 to the route, and transmit a route having a community value of CV1/CV3. The exemplary primary path may only allow routes initiated in AS1 110 that are set with a community value of CV1/CV3. All other routes may be denied. On the AS2 130 side of the path, these allowed routes may get set with a local attribute from GW3 130, wherein this local attribute may be a BGP local preference of 90 to make these routes the least preferred routes. GW3 130 may also sets these routes with a local BGP weight of 200 so that these routes are forwarded to RR2 140 and be advertised throughout AS2 130. However, even though these routes have a BGP local preference value of 90, a local routing decision in LHPE 134 of AS2 130 may set these routes with a BGP weight of 200 to make them the most preferred for AS1 110 traffic.

Furthermore, a secondary path may be advertised between AS1 110 and AS2 130. Only routes initiated from AS1 110 for a second community in AS2 130 may be set with a community value of CV2. The GW2 120 of AS1 110 may amend a further community value of CV4 to the route, and transmit a route having a community value of CV2/CV4. All other routes may be denied. The routes having community value of CV2/CV4 on the AS2 130 side of the path may be set with a BGP local preference of 120 to make them the most preferred routes in the second community. Since these routes are not set with the same BGP weight of 200 as the primary path, thus this path may serve as a secondary path for traffic from AS1 110 destined for the first community.

It is important to note that the above-described embodiment of the present invention specifies a system and method for path definition from AS1 110 to AS2 130 on a routing control plane is only for the transmission of data from AS2 130 to AS1 110. However, those of skill in the art will understand that the present invention may be implemented to use a similar symmetric mechanism for defining reversed routes for the transmission of data from AS1 110 to AS2 130. Furthermore, the reversed routes may or may not use the same paths defined in the forward routes.

According to alternative embodiments of the present invention, other BGP attributes may be considered such as multi-exit discriminator ("MED"), origin, AS path, and next hop. An MED may be used to indicate to an external AS a possible preferred route into the AS that is advertising the MED. The origin attribute indicates how a BGP learned of a particular route. The AS path attribute that includes the uses of ASNs to indicate which of the ASs a particular route advertisement has passed through. The next hop attribute may be defined as the IP address that is used for reaching the advertising router.

It will be apparent to those skilled in the art that various modifications may be made in the present invention, without departing from the spirit or the scope of the invention. Thus, it is intended that the present invention cover modifications and variations of this invention provided they come within the scope of the appended claimed and their equivalents.

What is claimed is:

1. A method, comprising:
   formatting an advertisement message having a dedicated preferred route to one of a first physical entity and a first logical entity of a recipient autonomous system ("AS"), the dedicated preferred route indicating at least two routing attributes, wherein a first routing attribute of the at least two routing attributes is defined by a first device of the recipient AS and a second routing attribute of the at least two routing attributes is defined by a second device of the recipient AS, further wherein the first routing attribute and the second routing attribute are different community values; and
   transmitting the advertisement message from the recipient AS to a sender AS,
   wherein the at least two routing attributes are used to route traffic to be sent from the sender AS to the recipient AS.

2. The method according to claim 1 further comprising:
   generating a further routing attribute at the sender AS; and
   identifying, by one of a second physical entity and a second logical entity in the sender AS, the dedicated preferred route based on the further attribute.

3. The method according to claim 2, wherein the further routing attribute is a local border gateway protocol attribute.

4. The method according to claim 3, wherein the local border gateway protocol attribute is selected from the group comprising weight attribute, local preference attribute, community value attribute, multi-exit discriminator attribute, origin attribute, AS path attribute, and next hop attribute.

5. The method according to claim 2, wherein the further routing attribute is generated on a last hop provider edge router of the sender AS.

6. The method according to claim 1, wherein the at least two routing attributes are global border gateway protocol attributes.

7. The method according to claim 6, wherein the global border gateway protocol attributes are selected from the group comprising weight attribute, local preference attribute, community value attribute, multi-exit discriminator attribute, origin attribute, AS path attribute, and next hop attribute.

8. The method according to claim 1, wherein a third routing attribute of the at least two routing attributes is defined by a third device of the recipient AS.

9. The method according to claim 8, wherein the first device is a customer edge router of the recipient AS.

10. The method according to claim 8, wherein the third device is an autonomous system border router of the recipient AS.

11. A routing device, comprising:
    a processor;
    a formatting module formatting an advertisement message having a dedicated preferred route to one of a first physical entity and a first logical entity of a recipient autonomous system ("AS"), the dedicated preferred route including at least two routing attributes, wherein a first routing attribute of the at least two routing attributes is defined by a first device of the recipient AS and a second routing attribute of the at least two routing attributes is defined by a second device of the recipient AS, further wherein the first routing attribute and the second routing attribute are different community values; and
    a transmitting module transmitting the advertisement message from the recipient AS to a sender AS,
    wherein the at least two routing attributes are used to route traffic to be sent from the sender AS to the recipient AS.

12. The routing device according to claim 11, wherein the at least two routing attributes are global border gateway protocol attributes.

13. The routing device according to claim 12, wherein the global border gateway protocol attributes are selected from the group comprising weight attribute, local preference attribute, community value attribute, multi-exit discriminator attribute, origin attribute, AS path attribute, and next hop attribute.

* * * * *